United States Patent [19]

Crosby

[11] 4,352,686

[45] Oct. 5, 1982

[54] SPINNER ROTATING APPARATUS

[75] Inventor: E. Eugene Crosby, Reynoldsburg, Ohio

[73] Assignee: Owens-Corning Fiberglas Corporation, Toledo, Ohio

[21] Appl. No.: 317,095

[22] Filed: Nov. 2, 1981

[51] Int. Cl.³ .............................................. C03D 37/04
[52] U.S. Cl. ........................................... 65/15; 65/16; 411/294; 411/297
[58] Field of Search ................... 192/105 BA, 105 BB; 411/294, 296, 297; 65/15, 16

[56] References Cited

U.S. PATENT DOCUMENTS

| Re. 25,306 | 12/1962 | Corsentino | 65/14 |
| 1,678,638 | 7/1928 | Dunham | 192/105 B |
| 1,851,146 | 3/1932 | Banker | 192/105 BA |
| 2,720,301 | 10/1955 | Slonneger | 192/105 BA |
| 3,233,990 | 2/1966 | Stephens et al. | 65/14 X |
| 3,265,447 | 8/1966 | McCoppin | 65/14 X |

FOREIGN PATENT DOCUMENTS

| 524389 | 9/1921 | France | 411/297 |
| 645532 | 10/1928 | France | 411/297 |

Primary Examiner—Robert L. Lindsay, Jr.
Attorney, Agent, or Firm—Ronald C. Hudgens; Philip R. Cloutier; Ted C. Gillespie

[57] ABSTRACT

Apparatus for rotating a spinner comprising a rotatable cap means, a quill upon which said spinner is mounted for rotation, and a threaded insert adapted to transmit a drive force from the rotatable cap means to the quill, where a stop means is mounted on the cap means and a ball mounted for radial movement with respect to the insert means is biased radially inwardly, and where outward radial movement of the ball causes engagement between the ball and the stop means to prevent relative movement between the insert means and the cap means.

8 Claims, 3 Drawing Figures

SPINNER ROTATING APPARATUS

TECHNICAL FIELD

This invention pertains to the manufacture of mineral fibers from molten mineral material, such as forming glass fibers from molten glass for insulation products. In one of its more specific aspects, this invention relates to transmitting a driving force from a drive means to a rotatably mounted spinner with which mineral fibers are formed from molten mineral material.

BACKGROUND OF THE INVENTION

A common practice in forming fibers of mineral material, such as glass fibers, is to discharge the molten glass into a rotating centrifuge or spinner. The spinner has an orificed peripheral wall, and the molten glass passes through the orifices to produce glass fibers. The spinner is mounted for rotation on a quill, and the quill is attahced via a threaded insert to a rotatable drive member, such as a locking cap. The locking cap is usually rotated with a conventional pulley, belt and motor. Since the life of a spinner is limited, the threaded insert which transmits the driving force from the locking cap to the quill, is threaded for insertion into the locking cap. Thus, when a spinner wears out, its quill and threaded insert can be simply unscrewed from the locking cap.

One of the problems associated with operating glass fiber forming equipment is that the threadable engagement of the quill and the threaded insert with the locking cap does not enable a secure locking mechanism during high-speed rotation of the apparatus. When rotated in one direction, the threaded insert is merely forced into tighter threadable engagement with the driving locking cap. But when the apparatus is to be rotated in a reverse direction the tendency is for the threaded insert to be unscrewed, thereby disengaging the threaded insert and quill from the locking cap. Thus, there is a need for means for enabling the threadable engagement of the threaded insert with the locking cap, and at the same time provision for locking the threaded insert and the locking cap to prevent relative movement to each other during high-speed rotation.

SUMMARY OF THE INVENTION

According to this invention there is provided apparatus for rotating a spinner comprising a quill upon which the spinner is mounted, rotatable cap means adapted to be rotated by a drive means, threaded insert means to which the quill is attached, the insert means being adapted to threadably engage the interior of the cap means and to transmit driving force from the cap means to the quill, where the improvement comprises stop means mounted on the cap means and a movable member mounted on the insert means for radial movement with respect to the insert means, the movable member being biased radially inwardly, and where outward radial movement of the movable member caused by rotation of the insert means results in engagement between the movable member and the stop means to prevent relative movement between the insert means and the cap means.

In one embodiment of the invention a ramp radially inwardly biases the movable member.

In a preferred embodiment of the invention the movable member is a ball.

According to this invention, there is also provided apparatus for manufacturing mineral fibers from molten material comprising a spinner having orificed peripheral walls, the spinner being adapted to receive and to centrifuge molten mineral material into mineral fibers, a quill upon which the spinner is mounted, rotatable cap means adapted to be rotated by a drive means, threaded insert means to which the quill is attached, the insert means being adapted to threadably engage the interior of the cap means and to transmit driving force from the cap means to the quill, where the improvement comprises stop means mounted on the cap means and a movable member mounted on the insert means for radial movement with respect to the insert means, the movable member being biased radially inwardly, and where outward radial movement of the movable member caused by rotation of the insert means results in engagement between the movable member and the stop means to prevent relative movement between the insert means and the cap means.

DESCRIPTION OF THE INVENTION

The invention will be described in terms of a glass fiber forming operation, although it is to be understood that the invention can be practiced using other heat softenable mineral materials such as rock, slag and basalt.

Figure 1:
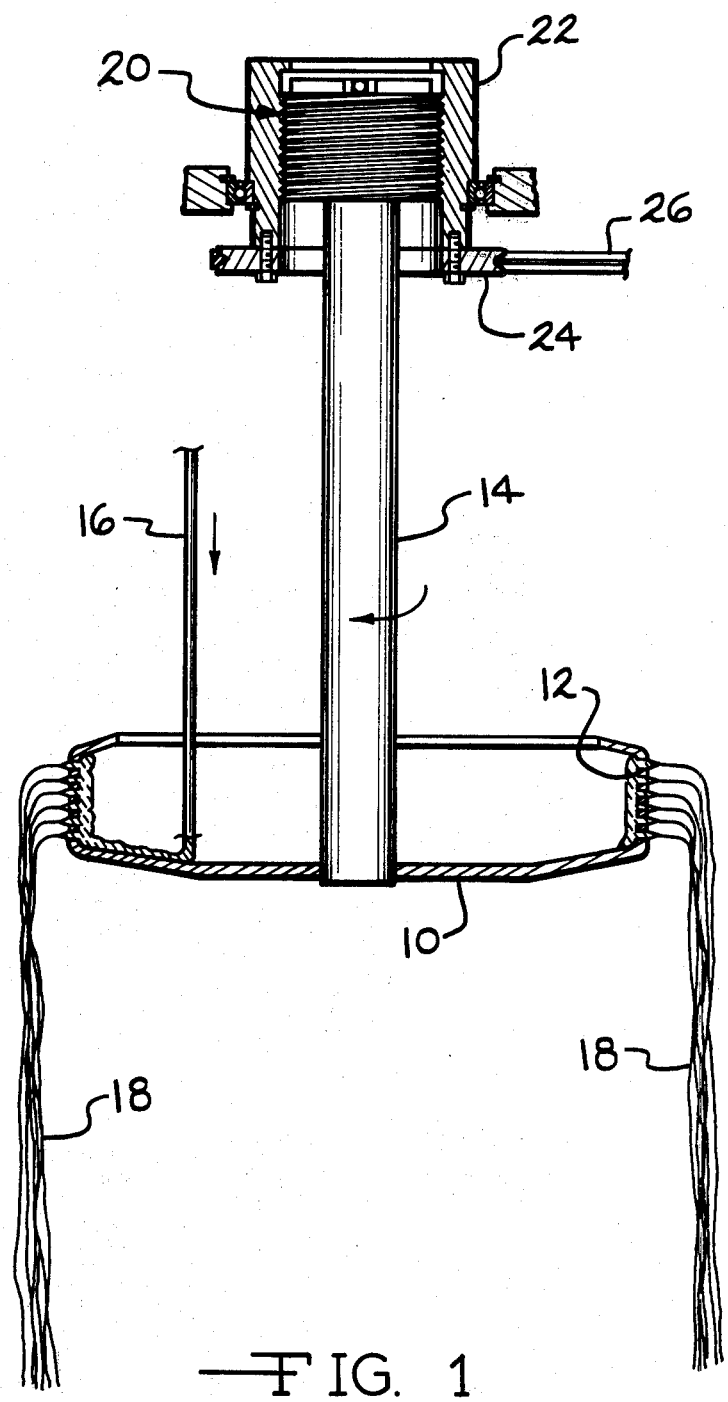
FIG. 1 is a schematic cross-section in elevation of apparatus for forming apparatus for forming mineral fibers according to the principles of the invention.

As shown in FIG. 1 spinner 10 is adapted with orificed peripheral walls 12 and mounted on quill 14 for rotation. Molten glass 16 can be discharged into the spinner, where it is centrifuged into glass fibers 18. The upper end of the quill is mounted in a threaded insert means, such as sheer pin assembly 20, which can be any means suitable for threadably engaging the cap means to transmit rotatable force from the cap means to the quill. The sheer pin assembly is threadably engaged in a cap means such as locking cap 22 which can be rotated by any suitable means such as pulley 24, belt 26 and an electric motor, not shown.

Figure 2:
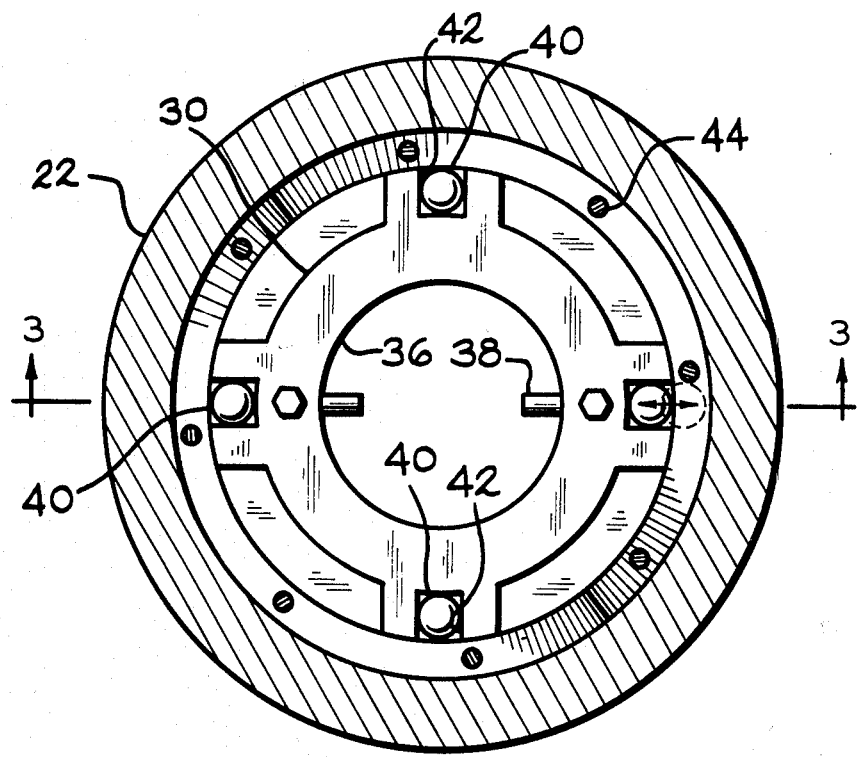
FIG. 2 is a schematic plan view of the apparatus for rotating the spinner shown in FIG. 1.
Figure 3:
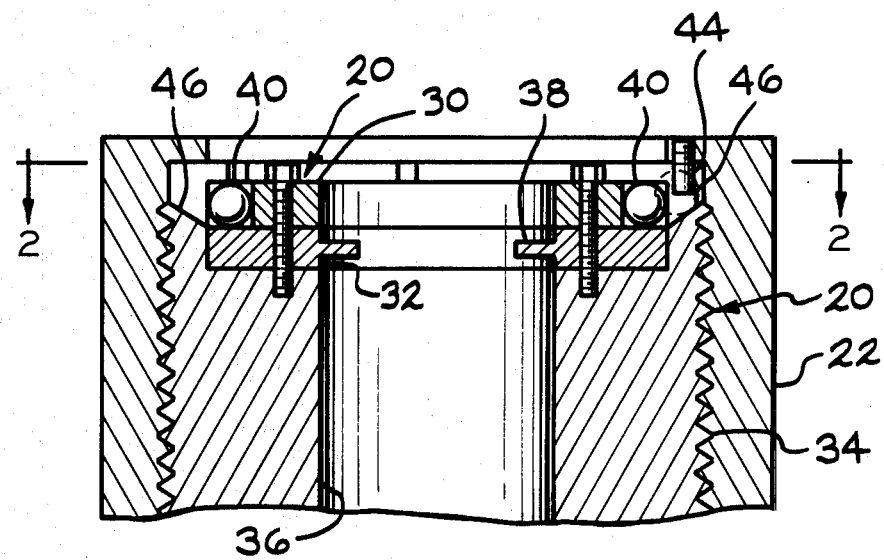
FIG. 3 is a schematic cross-section in elevation of the apparatus along the lines 3—3 of FIG. 2.

As shown in FIGS. 2 and 3 the sheer pin assembly can be comprised of ball retainer 30, sheer pin carrier 32 and inner locking nut 34, all of which can be bolted together. The sheer pin assembly is of generally annular shape, defining quill bore 36 for receiving the quill, which is not shown in FIGS. 2 and 3. The shear pin carrier can be adapted with members for positively engaging the quill, such as sheer pins 38, so that rotation of the shear pin assembly results in rotation of the quill.

The ball retainer contains one or more movable members, such as balls 40 which are mounted for radial movement with respect to the center or axis of rotation of the sheer pin assembly. As shown, the balls can be adapted to move radially inwardly or outwardly in keyways or slots 42, as shown by the phantom representation in FIG. 3. Mounted on the locking cap is a stop means, such as one or more roll pins 44. The stop means can be any member suitable for preventing relative motion between the ball, and therefore the entire sheer pin assembly, and the locking cap, provided the ball has been moved to its radially outward position.

The balls are biased radially inwardly in order to prevent engagement with the roll pin when the apparatus is not rotating, or when the shear pin and quill are being screwed into the locking cap. The radially inward biasing can be accomplished by any suitable means, such as by providing an inclined surface or ramp 46 for impeding the radially outward progress of the ball. Alternatively, a spring could be used for radially inwardly biasing the ball.

In operation the quill is attached to the sheer pin assembly via the sheer pins, and the quill and sheer pin assembly are threadably inserted into the locking cap. Upon rotation in either direction, centrifugal force moves the balls up their respective ramps and into engagement with one or more roll pins to prevent relative movement between the sheer pin assembly and the locking cap as long as the rotation continues.

It will be evident from the foregoing that various modifications can be made to this invention. Such, however, are considered as being within the scope of the invention.

INDUSTRIAL APPLICABILITY

This invention will be found to be useful in the formation of fibers from molten glass for such uses as glass fiber thermal insulation products and glass fiber acoustical insulation products.

I claim:

1. In apparatus comprising a fiber forming spinner having a quill upon which said spinner is mounted, a rotatable cap meane adapted to be rotated by a drive means, threaded insert means to which said quill is attached, said insert means being adapted to threadably engage the interior of said cap means and to transmit driving force from said cap means to said quill, wherein the improvement comprises stop means mounted on said cap means and a movable member mounted on said insert means for radial movement with respect to said insert means, said movable member being biased radially inwardly, and where outward radial movement of said movable member cause by rotation of said insert means results in engagement between said movable member and said stop means to prevent relative movement between said insert means and said cap means.

2. The apparatus of claim 1 comprising a ramp for radially inwardly biasing said movable member.

3. The apparatus of claim 2 in which said movable member comprises a ball.

4. The apparatus of claim 3 in which said stop means comprises a plurality of pins.

5. Apparatus for manufacturing mineral fibers from molten material comprising a spinner having orificed peripheral walls, said spinner being adapted to receive and to centrifuge molten mineral material into mineral fibers, a quill upon which said spinner is mounted, a rotatable cap means adapted to be rotated by a drive means, threaded insert means to which said quill is attached, said insert means being adapted to threadably engage the interior of said cap means and to transmit driving force from said cap means to said quill, a stop means mounted on said cap means and a movable member mounted on said inert means for radial movement with respect to said insert means, said movable member being biased radially inwardly, and where outward radial movement of said movable member caused by rotation of said insert means results in engagement between said movable member and said stop means to prevent relative movement between said insert means and said cap means.

6. The apparatus of claim 5 comprising a ramp for radially inwardly biasing said movable member.

7. The apparatus of claim 6 in which said movable member comprises a ball.

8. The apparatus of claim 7 in which said stop means comprises a pluraity of pins.

* * * * *

UNITED STATES PATENT AND TRADEMARK OFFICE
CERTIFICATE OF CORRECTION

PATENT NO. : 4,352,686

DATED : October 5, 1982

INVENTOR(S) : E. Eugene Crosby

It is certified that error appears in the above—identified patent and that said Letters Patent is hereby corrected as shown below:

At column 1, line 21, the word "attahced" should be changed to "attached".

At column 2, line 2, the word "mineral" should be added after "molten".

At column 2, line 25, the words "for forming apparatus" should be deleted.

At column 2, line 55, the word "shear" should be changed to "sheer".

At column 2, line 58, the word "shear" should be changed to "sheer".

At column 3, line 5, the word "shear" should be changed to "sheer".

At column 3, line 33, the word "meane" should be changed to "means".

At column 4, line 4, the word "cause" should be changed to "caused".

At column 4, line 25, the word "inert" should be changed to "insert".

Signed and Sealed this

Twenty-sixth Day of June 1984

[SEAL]

Attest:

GERALD J. MOSSINGHOFF

Attesting Officer   Commissioner of Patents and Trademarks